March 22, 1960
J. FEDAK
2,929,169
FISHING FLOAT ATTACHING MECHANISM
Filed Dec. 15, 1958
2 Sheets-Sheet 1
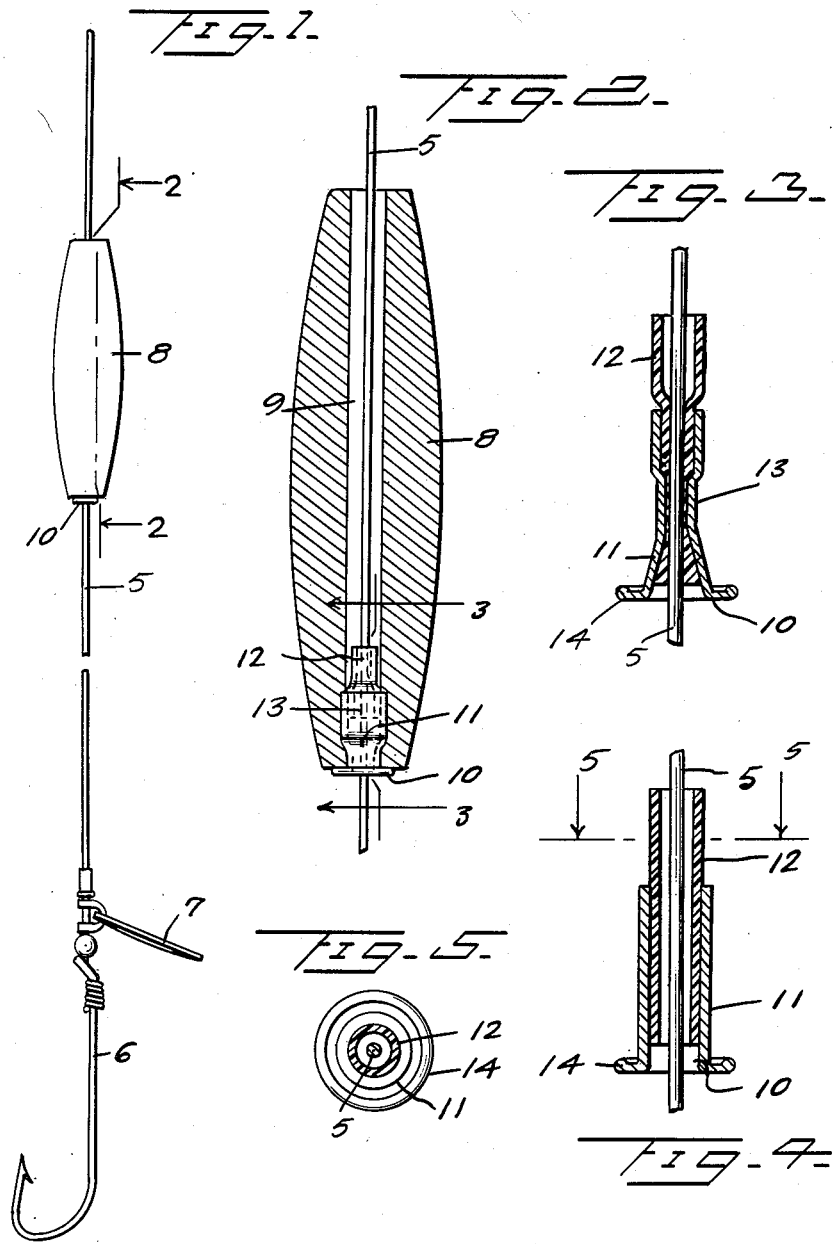
John Fedak
INVENTOR
BY *CA Snow & Co.*
ATTORNEYS.

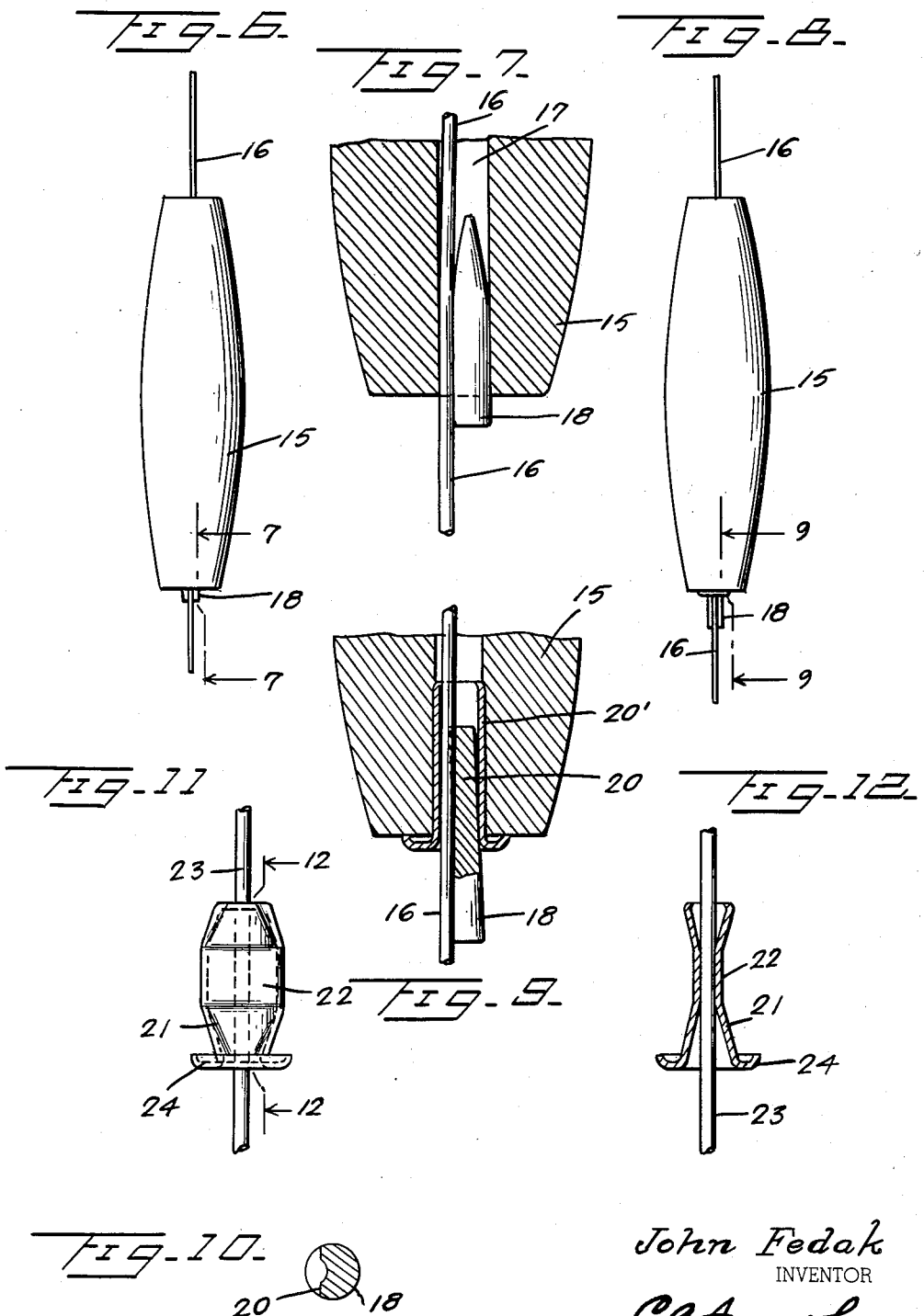

United States Patent Office 2,929,169
Patented Mar. 22, 1960

2,929,169
FISHING FLOAT ATTACHING MECHANISM
John Fedak, Atlantic City, N.J.

Application December 15, 1958, Serial No. 780,288

2 Claims. (Cl. 43—44.91)

This invention relates to fishing floats, and more particularly to mechanism for attaching floats to fish lines or leaders.

The primary object of the invention is to provide means for securing a float to a fish line or leader so that the float may be adjusted for maintaining the hook or hooks used on the line at various depths, thereby adapting the line for fishing under diverse conditions.

A further object of the invention is to provide friction mechanism for holding the float in various adjusted positions along the line, adjustment of the float being accomplished by merely moving the float along the line to the desired position.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is an elevational view of a float which is attached to a fish line in accordance with the invention.

Fig. 2 is a longitudinal sectional view taken on line 2—2 of Fig. 1.

Fig. 3 is a sectional view taken on line 3—3 of Fig. 2.

Fig. 4 is a longitudinal sectional view through a metal eyelet and plastic tube, prior to the crimping of the metal eyelet.

Fig. 5 is a sectional view taken on line 5—5 of Fig. 4.

Fig. 6 is an elevational view illustrating a modified float attaching means.

Fig. 7 is a sectional view taken on line 7—7 of Fig. 6.

Fig. 8 is an elevational view of a modified form of float attaching mechanism.

Fig. 9 is a sectional view taken on line 9—9 of Fig. 8.

Fig. 10 is a transverse sectional view through the peg forming a part of the modified form of the invention.

Fig. 11 is a side elevational view of a further modified form of the invention.

Fig. 12 is a sectional view taken on line 12—12 of Fig. 11.

Referring to the drawings in detail, a fish line is indicated by the reference character 5 to one end of which is attached the conventional hook 6 and spinner 7.

The float constituting the subject matter of the present invention is indicated generally by the reference character 8 and is provided with a bore 9 extending longitudinally therethrough, and through which the line 5 extends.

The reference character 10 indicates a metal eye which is formed with a tubular extension 11 through which the line 5 extends, as better shown by Fig. 3 of the drawings.

A plastic tube indicated by the reference character 12 extends into one end of the tubular extension 11, as shown by Fig. 3 of the drawings, and the tubular extension is then crimped or flattened as at 13, securely pressing the end of the plastic tube 12 extending into the end of the tubular extension 11, so that the plastic tube is brought into close frictional contact with the line 5, but at the same time permitting the securing device to slide over the line.

The eye 10 is flared at 14 so that a wide portion of the metal in which the eye is formed, is flattened to contact one end of the float and prevent the tubular extension from being drawn into the float by the frictional contact between the tubular extension or eye and float.

In the form of the invention as shown by Fig. 7 of the drawings, the float is indicated by the reference character 15, the fish line being indicated by the reference character 16, and as shown, the fish line 16 extends through the bore 17 of the float 15. In this form of the invention a pin 18 is used for wedging the line 16 into frictional contact with the wall of the bore 17, holding the float 15 in various positions of adjustment along the line.

The pin or plug 18 is formed with a groove in the surface thereof, the groove following the tapered end 20 of the pin so that a wedging action takes place between the pin and line 16 when the pin 18 is forced into the metal tube 20' which is forced into the bore of the float 15.

In this form of the invention it is only necessary to remove the pin 18 or loosen the pin within the tube 20', and slide the float 15 to the desired position. The pin is then forced into the tubular member 20' setting up a binding action between the tube and line 16, securely holding the float in its properly adjusted position.

In the form of the invention as shown by Figs. 11 and 12, it will be noted that the securing device embodies a metallic tube 21 which is pressed inwardly at 22, flattening the central portion of the tube 21 causing the tube to grip the line 23 on which the float is positioned, so that the float, which is positioned over the tube 21, will be held by frictional contact between the tube and line 23 to secure the float in various positions of adjustment.

In this form of the invention, one end of the tube is provided with an annular flange 24 that engages the end of the float secured thereto, preventing the metallic tube from being drawn through the bore of the float.

From the foregoing it will be seen that due to the construction shown and described, I have provided means for readily and easily adjusting a float on a fish line, to adapt the fishing line and hook for use in fishing at various depths.

It might be further stated that because of the novel form of connecting the float to its fish line, the float will be held in position by frictional contact between the plastic tube.

Having thus described the invention, what I claim is:

1. An attachment means for securing a fishing line to a float having a bore therethrough which receives the line, comprising a plastic tube surrounding the line, and a metal tube adapted to be received within the bore through the float surrounding the plastic tube and having a constricted section therein forcing the plastic tube into tight frictional engagement with the line.

2. An attachment means for securing a fishing line to a float having a bore therethrough which receives the line, comprising a plastic tube surrounding the line, and a metal tube adapted to be received within the bore through the float surrounding the plastic tube and having an end flange thereon limiting the extent of insertion within the bore of the float and having a constricted section therein forcing the plastic tube into tight frictional engagement with the line.

References Cited in the file of this patent

UNITED STATES PATENTS

| 928,439 | Garrard | July 20, 1909 |
| 1,547,746 | Gore | July 28, 1925 |
| 2,293,294 | Hickman | Aug. 18, 1942 |

FOREIGN PATENTS

| 9,183 | Great Britain | Apr. 21, 1904 |
| 1,120,300 | France | Apr. 16, 1956 |